US005741196A

United States Patent [19]
Campagnolo

[11] Patent Number: 5,741,196
[45] Date of Patent: Apr. 21, 1998

[54] TRANSMISSION CHAIN PARTICULARLY FOR A BICYCLE

[75] Inventor: Valentino Campagnolo, Vicenza, Italy

[73] Assignee: Campagnolo S.r.l., Vicenza, Italy

[21] Appl. No.: 790,023

[22] Filed: Jan. 28, 1997

[30] Foreign Application Priority Data

Mar. 18, 1996 [IT] Italy ................... TO96A0206

[51] Int. Cl.$^6$ ................................................. F16G 13/02
[52] U.S. Cl. ........................ 474/226; 474/209; 474/206
[58] Field of Search ................................ 474/202, 206, 474/209, 212, 226, 210, 231, 232

[56] References Cited

U.S. PATENT DOCUMENTS 4,983,147  1/1991  Wu ................................ 474/206
5,066,265  11/1991  Wu ................................ 474/206

Primary Examiner—Tamara L. Graysay
Assistant Examiner—Gary S. Hartmann
Attorney, Agent, or Firm—Sughrue, Mion, Zinn, Macpeak & Seas, PLLC

[57] ABSTRACT

A transmission chain, particularly for a bicycle, has inner links alternated to outer links. The inner and outer links are constituted by pairs of plates articulated to each other by means of pins. The plates of the inner links have their outer surfaces with a depressed central portion. The plates of the outer links have their inner surfaces with a depressed central portion. The plates of the outer links further have through holes for engagement of the articulation pins with enlarged end mouths opening on the outer surfaces of these plates, which receive the riveted ends of the articulation pins.

6 Claims, 4 Drawing Sheets

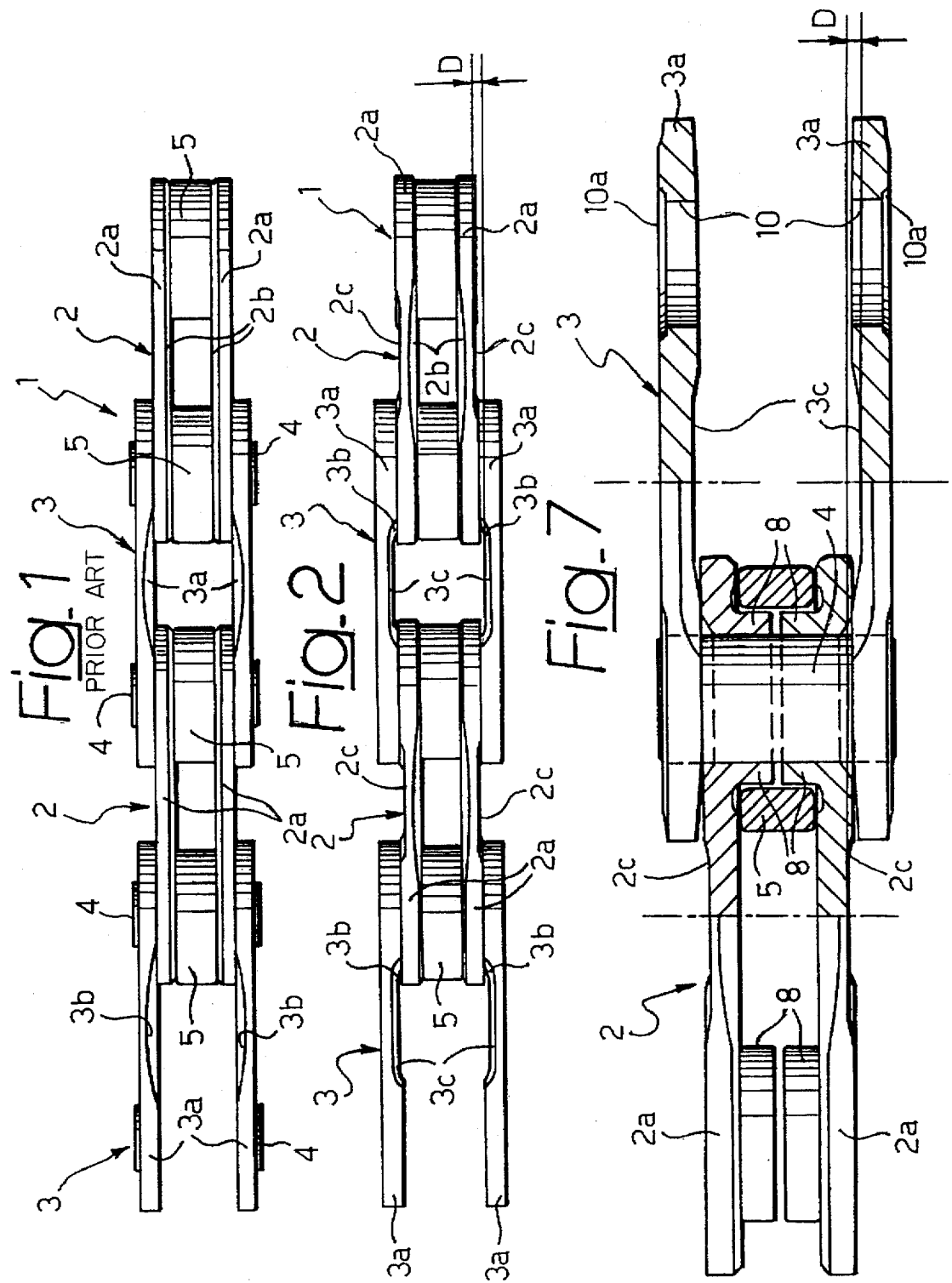

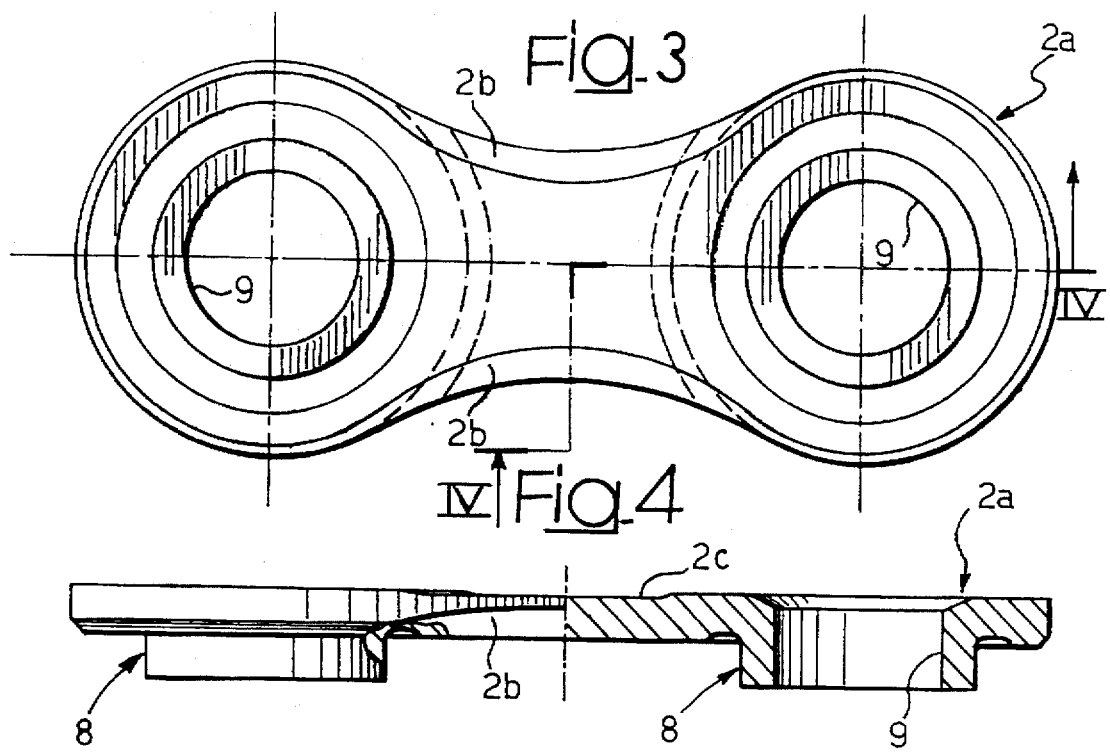
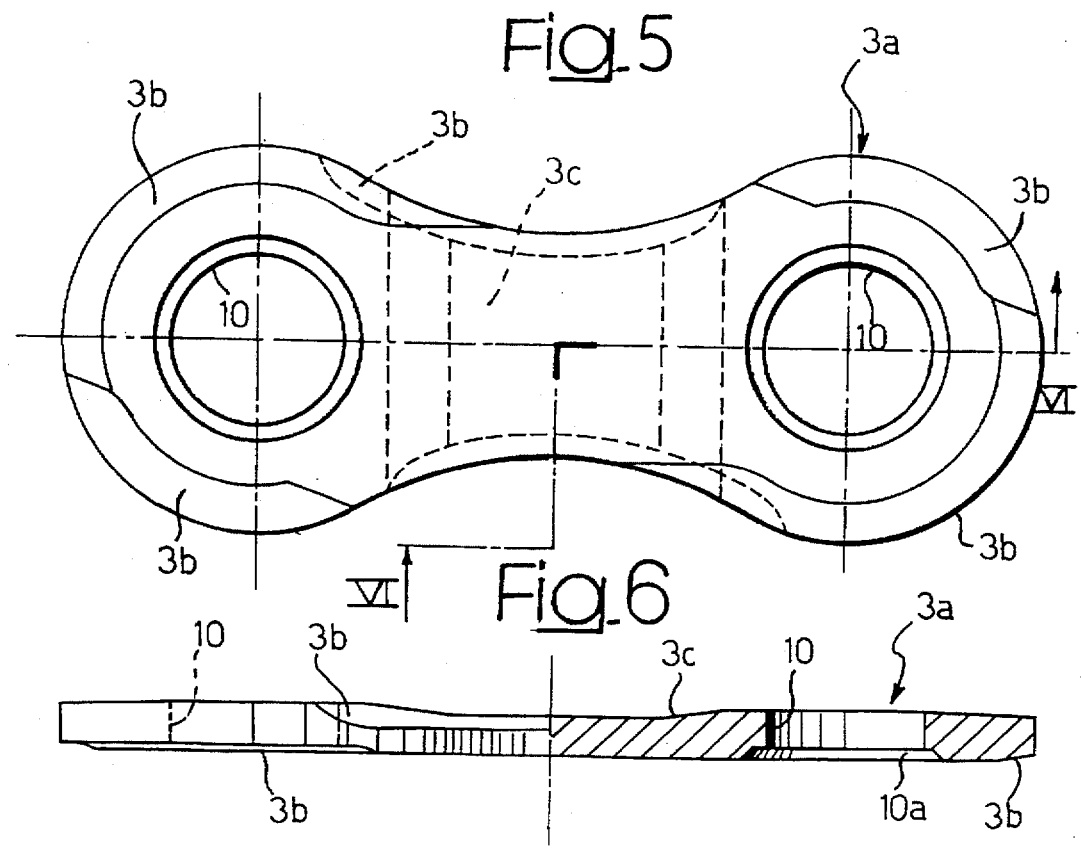

1

TRANSMISSION CHAIN PARTICULARLY FOR A BICYCLE

BACKGROUND OF THE INVENTION

The present invention relates to transmission chains, particularly for bicycles, of the type comprising a plurality of chain links articulated to each other and constituted by pairs of elongated, parallel and spaced apart plates, arranged alternatively at the outside and the inside of each other, so as to define outer chain links alternated to inner chain links, said links being articulated to each other by means of pins fixed at their ends to the plates of the outer chain links.

Bicycle chains of the above indicated type are well known and have been used since a long time. According to the conventional art, each articulation pin of the chain extends through the respective pair of inner link plates, as well as the respective pair of outer link plates which are arranged at opposite sides, outside of the two inner link plates and adjacent to the ends of the pin. These ends project outside from the two outer link plates and are fixed thereto by permanent deformation. In a conventional chain of this type, therefore, the ends of the pins project beyond the outer surface of the outer link plates, so that they are exposed to shocks against the members of the bicycle transmission (rear sprockets and front gears) during each speed change, with a resulting noise.

In the past, in the endeavour to overcome this drawback, there have been proposed various solutions in which the ends of the articulation pins of the chain do not project beyond the outer most surface of the outer link plates of the chain. For instance U.S. Pat. No. 4,102,216 (corresponding to DE-C-2 658 651 and FR-A-2 337 076) shows a chain in which the inner link plates have, according to the conventional art, a planar configuration with a uniform thickness, whereas the outer link plates have also a uniform thickness but have a central portion, intermediate between their ends, which is expanded outwardly, so as to have an outer surface which projects more with respect to the ends of the pins and therefore protects these pins from the risk of collisions with other members of the bicycle transmission during the operation of the speed change.

Studies and tests conducted by the Applicant have shown however that this solution is not fully satisfactory from the stand point of noiselessness. Furthermore, it would be desirable to provide a chain which has such features as to render the engagement of the chain on a sprocket associated with the rear wheel of the bicycle, in case of operation of the bicycle rear derailleur, or on a gear associated to the crank axle of the bicycle (in case of operation of the bicycle front derailleur) more precise, more rapid and easier, each time that shifting of the chain is caused to a sprocket or gear of greater diameter with respect to the diameter of the sprocket or gear on which the chain was previously engaged.

FR-A-2 715 981 also shows a chain in which the ends of the articulation pins do not project beyond the outer surfaces of the outer link plates of the chain. In this case, the outer surfaces of the outer link plates of the chain have a depressed longitudinal intermediate portion in which there are received the riveted ends of the articulation pins, which therefore do not project beyond the outer most profile of the outer link plates. Also in this case, although the problem of avoiding a projection of the articulation pins from the outer link plates of the chain is solved, a chain is obtained which do not have features which are able to improve the rapidity and precision of the speed change operation.

SUMMARY OF THE INVENTION

The object of the present invention is that of providing a bicycle chain of the type indicated at the beginning, which improves the precision, the speed and the easiness of engagement of a chain on a sprocket or a gear following a speed change operation.

In order to achieve this object, the invention provides a chain of the above indicated type, characterized in that the outwardly facing surface of each inner link plate of the chain has a depressed surface portion at a central area, intermediate between the two ends of the plate.

Each inner link plate has therefore a substantially planar surface on its inner side and a surface having a depressed central portion, which defines a plate portion with reduced thickness, on its outer side. Due to this feature, during shifting of the chain from a sprocket or gear of smaller diameter to a sprocket or gear of greater diameter, the chain portion which has come out of engagement with the sprocket or gear of smaller diameter and has not yet come into engagement with the sprocket or gear of greater diameter can displace more in the direction of the sprocket or gear of greater diameter, the orientation of this chain portion being defined by the contact between said depressed portion of the outer surface of an inner link of the chain with a tooth of the sprocket or gear of greater diameter. As a result of this depression, when this contact takes place, the said chain portion is more inclined in the direction of the sprocket or gear of greater diameter, which facilitates the proper meshing of the chain portion which is already coming into engagement with the sprocket or gear of greater diameter.

Preferably, according to a further feature of the chain according to the invention, the inwardly facing surface of each outer link plate of the chain has a depressed surface portion, at a central area intermediate between the two ends of the plate. Therefore, also each outer link plate of the chain has not a uniform thickness. Each outer plate has a substantially planar outer surface and an inner surface which has the said depressed central portion, so as to give raise to a central plate portion with reduced thickness. Therefore, the gap between each pair of outer link plates is increased, which facilitates the engagement of each outer link of the chain on the two sides of a tooth of the sprocket or gear which receives the chain, during speed change operation.

Finally, preferably, in order to increase the noiselessness of the chain, also the chain according to the invention has articulation pins which do not project beyond the outer most profile of the outer link plates of the chain. To this end, the outer link plates of the chain have holes for engagement of the articulation pins which have enlarged end mouths opening on the outer surfaces of said plates and receiving the riveted ends of the articulation pins.

BRIEF DESCRIPTION OF THE DRAWINGS

Further features and advantages of the invention will become apparent from the description which follows with reference to the annexed drawings, given purely by way of non-limiting example, in which:

FIG. 1 is a view of a portion of a bicycle transmission chain according to the conventional art, FIG. 2 is a view of a portion of a bicycle chain according to the invention, FIG. 3 is a front view of an inner link plate of the chain according to the invention, FIG. 4 is a cross-sectional view taken along line IV—IV of FIG. 3, FIG. 5 is a front view of the outer link plate of the chain according to the invention, FIG. 6 is a cross-section taken along line VI—VI of FIG. 5, FIG. 7 is a partially sectional view, at an enlarged scale of a detail of FIG. 2.

DETAILED DESCRIPTION OF THE INVENTION

Figure 8:
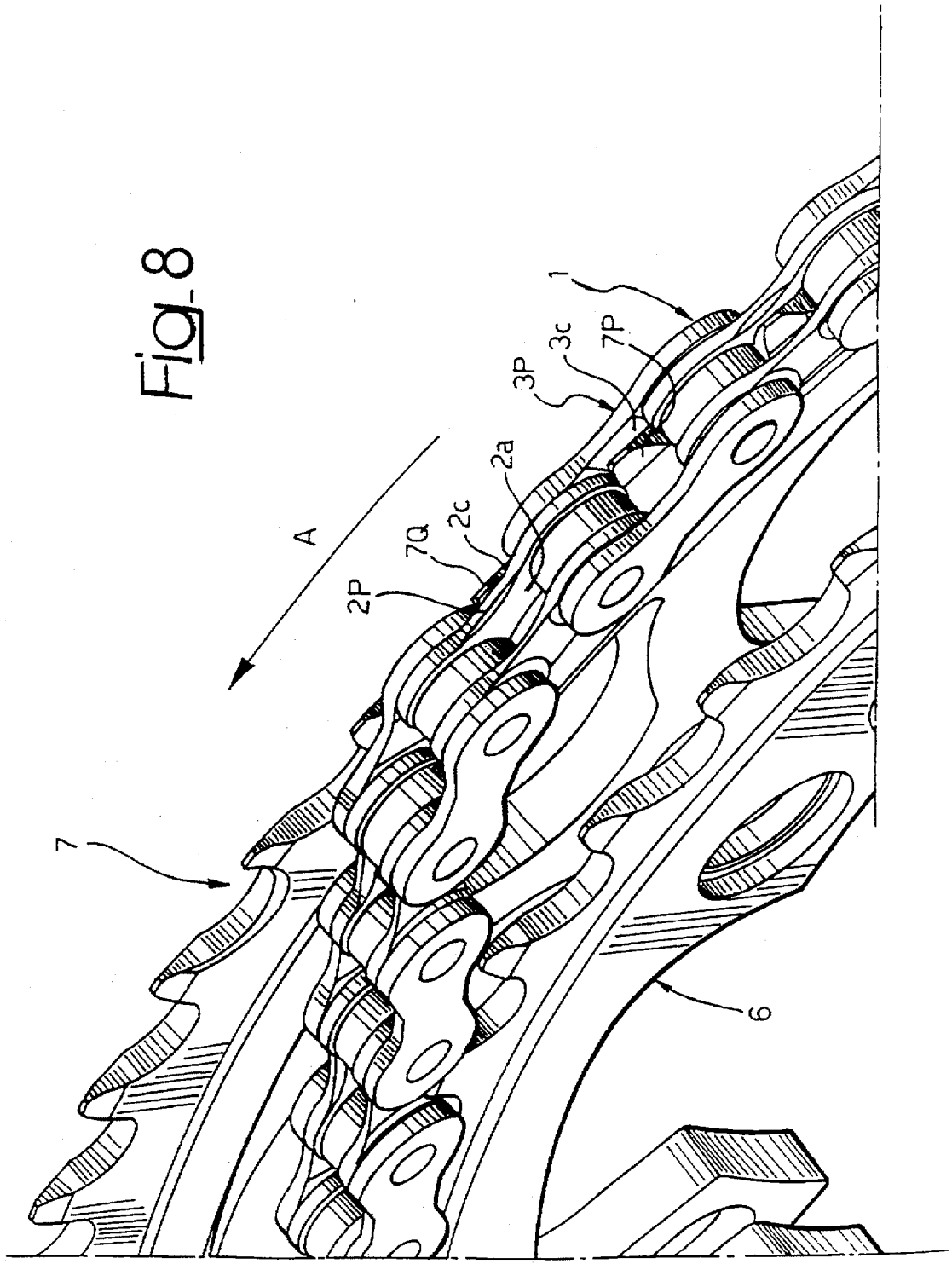
FIG. 8 is a perspective partial view of a pair of gears associated with the bicycle crank axle, which shows the portion of bicycle chain which is going out of engagement with a gear of smaller diameter and is coming into engagement with a gear of greater diameter.

With reference to FIG. 1, numeral 1 designates a bicycle chain according to the prior art comprising a plurality of inner links 2 alternated to a plurality of outer links 3. Each inner link 2 comprises a pair of planar plates 2a parallel to and spaced apart from each other, whereas the outer links 3 each have a pair of parallel and spaced planar plates 3a. The inner and outer links 2, 3 are articulated to each other by articulation pins 4 on whose axes there are rotatably mounted spacer rollers 5 which keep plates 2a of each inner link 2 spaced apart from each other.

The solution shown in FIG. 1 relates to the most conventional art, in which plates 2a, 3a all have a planar configuration with a uniform thickness, except for the arrangement of bevelled areas 2b, 3b on their edges, and in which pins 4 have their ends riveted above the outer surfaces of the outer plates 3a and projecting beyond the outer profile of the outer plates 3a.

As already indicated in the preamble of this description, bicycle chains have already been proposed in which the outer surface of each outer plate 3a is expanded outwardly (U.S. Pat. No. 4,102,216) so as to project more than the ends of the articulation pins 4, or in which the ends of the pins 4 are received within depressed areas of said outer surface of the outer plates 3a (FR-A-2 715 981).

FIG. 2 shows a preferred embodiment of the chain according to the invention.

In this figure, parts corresponding to those of FIG. 1 are designated by the same reference numeral. The main feature of the chain according to the invention lies in that the plates 2a of the inner links 2 of the chain have their outwardly facing surface with has a depressed portion 2c at a central area, intermediate between the ends of each plate 2a. The advantage resulting from the provision of this depressed surface portion 2c is immediately apparent from FIGS. 8, 9 of the annexed drawings.

Figure 9:
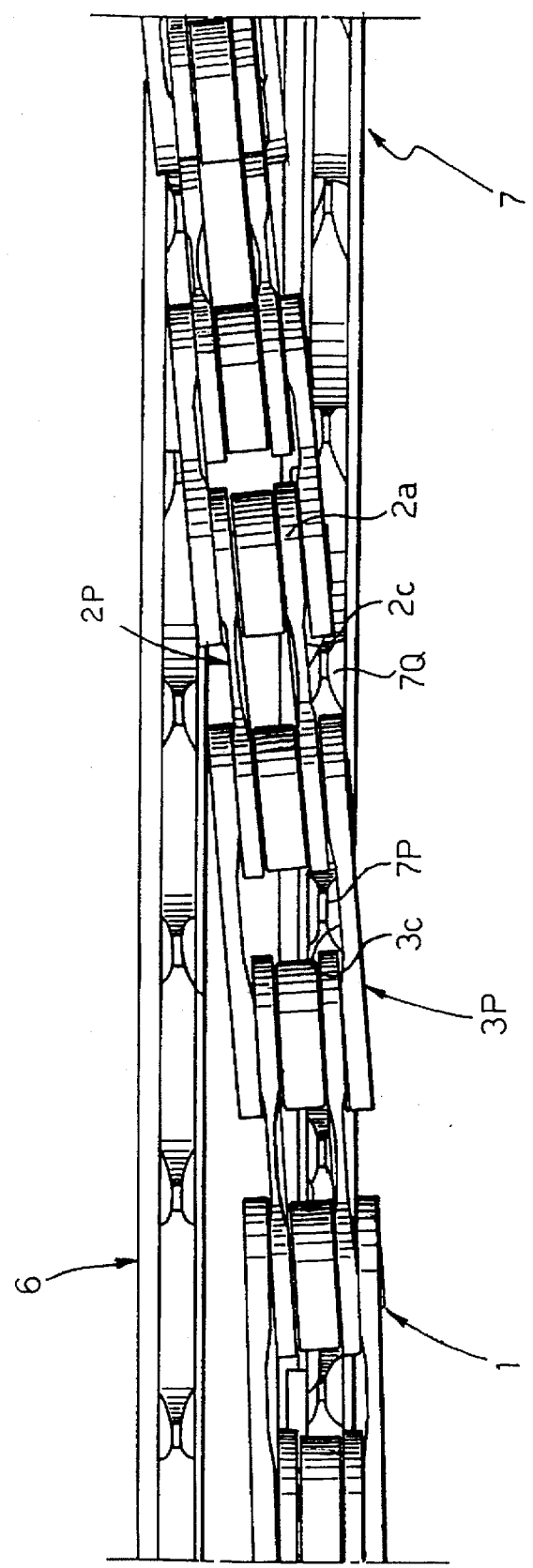
FIG. 9 is a front view developed in a plane of the arrangement of FIG. 8.

In FIGS. 8, 9, reference numerals 6, 7 designate two gears (shown only partially in the figures) of a type known per se, associated to the crank axle of a bicycle, which are driven in rotation by the bicycle pedals in the direction indicated by arrow A. The figures also show the portion of chain 1 according to the present invention which is going out of engagement with the gear 6 of smaller diameter and is coming into engagement with a gear 7, of greater diameter. As shown in these figures, the chain portion which extends between gear 6 and gear 7 has an outer link designated by 3P which is already arranged on both sides of a tooth 7P of gear 7, i.e. with its two plates arranged on both sides of tooth 7P. The inner link which immediately follows outer link 3P is designated by 2P. As shown, this inner link 2P is not arranged on both sides of a tooth of gear 7, but has one plate 2a in contact with tooth 7Q of gear 7. More precisely, tooth 7Q is in contact with the depressed portion 2c of the outer surface of plate 2a of the inner link 2P. As a result of this, due to this depressed surface, the inner link 2P is displaced more towards the plane of gear 7, with respect to what happens in the conventional case, in which there is no depression 2c. Therefore, the chain portion interposed between gear 6 and gear 7 is more inclined in the direction of the plane of gear 7 with respect to what happens with the known chains. As a result of this greater inclination, the engagement of link 3P on both sides of tooth 7P takes place more easily, more rapidly and more precisely, which therefore renders the whole shifting of the chain easier, more rapid and more precise.

Yet with reference to FIG. 2, preferably, the chain according to the invention is further characterized in that the plates 3a of the outer links 3 of the chain have a depressed central portion 3c, intermediate between the ends of each plate 3a, on the inner surface of the plate. Due to this further feature, the gap between the facing surfaces of the plates 3a of each outer link is increased. As a result, reverting to FIGS. 8, 9, in this specific case the gap between the plates of outer link 3P is increased, which further facilitates and speeds up the engagement of the plates of this outer link on both sides of tooth 7P of gear 7. In FIG. 2, by D there is designated the distance between the bottom plane of depression 2c formed on the outer surfaces of the inner links and the bottom surface of depression 3c formed on the inner surfaces of the plates of the outer links. In the case of the known solution of FIG. 1, distance D is zero.

FIGS. 3–7 show in detail the configuration of plates 2a, 3a of the chain. With reference to FIGS. 3, 4 and 7, each plate 2a of an inner link 2 has, in the illustrated example, an elongated configuration with rounded ends and an intermediate portion notched on both sides. On its inner face, each plate 2a of each inner link 2 has two hubs 8 each having a central hole 9 for engagement of the articulation pin 4, these hubs 8 further rotatably supporting on their turn the respective rollers 5 (FIG. 7). As shown, apart from the projection of hubs 8, and the bevelled edge areas 2b, the inner surface of each plate 2a is planar, so that the provision of the depressed surface portion 2c at the central area of the outer surface, defines a central plate portion with a reduced thickness with respect to the ends of the plate.

With reference to FIGS. 5–7, each plate 3a of each outer link 3 has a profile similar to that of the inner plates, with rounded ends and a central area notched on both sides. Also in this case, the outer surface of each plate 3a, except for the bevelled areas 3b, is substantially planar, so that the provision of the depressed central area 3c on the inner surface of the plate defines a plate central portion with a reduced thickness with respect to the ends. The two ends of the plate 3a have through holes 10 for engagement of the articulation pins 4. Each hole 10 has an enlarged end mouth 10a opening on the outer surface of each plate 3a of each outer link of the chain. The bottom surface of this enlarged mouth 10a receives the riveted end of the respective articulation pin 4(which in FIG. 7 is shown before the deforming operation is carried out) so that, once the pin 4 has been fixed to plates 3a of the respective outer link 3 by this deforming operation, the pin does not project, or projects to a very reduced extent, with respect to the outer profile of plates 3a. The ends of the pin are therefore protected by the risk of collision with other members of the bicycle transmission during operation of the speed change, with a resulting increased noiselessness of the transmission.

From the foregoing description, it is clearly apparent that the chain according to the invention, particularly due to the provision of depressions 2c on the inner links, and preferably also due to the provision of depression 3c on the outer links, provides a greater rapidity, easiness and precision of the shifting operation of the chain from a sprocket or gear of smaller diameter to a sprocket or gear of greater diameter. At the same time, the ends of the articulation pins of the chain do not project beyond the profile of the outer links of the chain, so that they do not enter in collision with the members of the bicycle transmission during the operation of the speed change, so as to insure a noiseless operation.

Naturally, while the principle of the invention remains the same, the details of construction and the embodiments may widely vary with respect to what has been described and illustrated purely by way of example, without departing from the scope of the present invention.

What is claimed is:

1. Transmission chain, particularly for a bicycle, comprising a plurality of chain links articulated to each other and constituted by pairs of elongated, parallel and spaced apart plates alternatively arranged outside and inside of each other, so as to define outer chain links alternated to inner chain links, said links being articulated to each other by pins fixed at their ends to the plates of the outer chain links, wherein the outwardly facing surface of each plate of each inner chain link has a depressed surface portion at a central area intermediate between the two ends of the plate.

2. Chain according to claim 1, wherein the inwardly facing surface of each plate of each outer chain link has a depressed surface portion at a central area intermediate between the two ends of the plate.

3. Chain according to claim 1, wherein each plate of each outer chain link has through holes for engagement of respective articulation pins, each hole having an enlarged end mouth opening on the outer surface of the plate and which is for receiving at least partially the riveted end of the respective articulation pin.

4. Chain according to claim 1, wherein each plate of each chain inner link has its inwardly facing surface which is substantially planar, so that said depressed surface portion provided on the outer surface of said plate defines a central plate portion with a reduced thickness with respect to the end.

5. Chain according to claim 2, wherein the outwardly facing surface of each plate of each outer chain link is substantially planar, so that said depressed surface portion provided on the inner surface of said plate defines a central portion of said plate having a reduced thickness with respect to the ends.

6. Chain according to claim 2, wherein each plate of each outer chain link has through holes for engagement of respective articulation pins, each hole having an enlarged end mouth opening on the outer surface of the plate and which is for receiving at least partially the riveted end of the respective articulation pin.

* * * * *